July 22, 1958 R. ADLER 2,844,755

ELECTRON DISCHARGE DEVICE

Filed June 29, 1953

ROBERT ADLER
*INVENTOR.*

BY Francis W. Crotty

HIS ATTORNEY.

United States Patent Office 2,844,755

Patented July 22, 1958

2,844,755

ELECTRON DISCHARGE DEVICE

Robert Adler, Northfield, Ill., assignor to Zenith Radio Corporation, a corporation of Delaware Application June 29, 1953, Serial No. 364,764

7 Claims. (Cl. 315—5.24)

This invention relates to new and improved electron-discharge devices of the type employing deflection control, commonly known as beam-deflection tubes, and to oscillators employing such devices.

Relatively recent advances in the electronics art have led to an increased use of the higher-frequency portions of the frequency spectrum for commercial purposes, as exemplified by the very-high-frequency (V. H. F.) and ultra-high-frequency (U. H. F.) television broadcast ranges and the frequency-modulation radio band. As a result, manufacturers of receivers adapted for use at these frequencies have been faced with the necessity of developing suitable stable oscillators for generating demodulating or heterodyning signals within the same general range of frequencies. Intensity-modulation devices of the familiar grid-control type which are capable of operation as oscillators within both the V. H. F. and U. H. F. frequency ranges have been developed; however, these tubes present several inherent difficulties, among which are the necessity of maintaining relatively exacting dimensional tolerances and the problems presented in compensating for changes in the electrical characteristics of the devices due to changes in thermal operating conditions. On the other hand, velocity-modulation devices such as klystrons and magnetrons appear to be too complex and expensive for receiver applications and are not particularly satisfactory for operation in the lower or V. H. F. portion of the newly-utilized frequency ranges.

Accordingly, it is a primary object of the invention to provide a new and improved beam-deflection tube which is capable of operation as an oscillator at frequencies within the V. H. F. and U. H. F. ranges and which does not present the problems and difficulties noted above in connection with the use of intensity- or velocity-modulation devices.

It is a further object of the invention to provide a new and improved oscillator circuit for use at very-high or ultra-high frequencies which employs an electron-discharge device of the beam-deflection type.

It is an additional object of the invention to provide a new and improved beam-deflection tube or electron-discharge device which is relatively simple and expedient to construct and economical to manufacture.

A beam-deflection oscillator constructed in accordance with the invention comprises an electron gun for projecting a sheet-like beam of electrons along a predetermined path at a predetermined velocity and a collector electrode disposed transversely across the electron-beam path in spaced relation to the electron gun. Means including a pair of deflector-receptor electrodes of predetermined effective length are disposed on opposite sides of the beam path intermediate the electron gun and the collector electrode are provided for establishing a beam-electron transit time, through the portion of the path corresponding to the predetermined effective length, of five-fourths of a predetermined resonance period. The oscillator further comprises means including an inductive impedance element interconnecting the deflector-receptor electrodes to form therewith a resonant circuit having a resonance period substantially equal to the predetermined resonance period.

The features of the invention which are believed to be novel are set forth with particularity in the appended claims. The organization and manner of operation of the invention, together with further objects and advantages thereof, may best be understood by reference to the following description taken in conjunction with the accompanying drawing, in which like elements are identified by like numerals in each of the figures, and in which:

Figure 1:
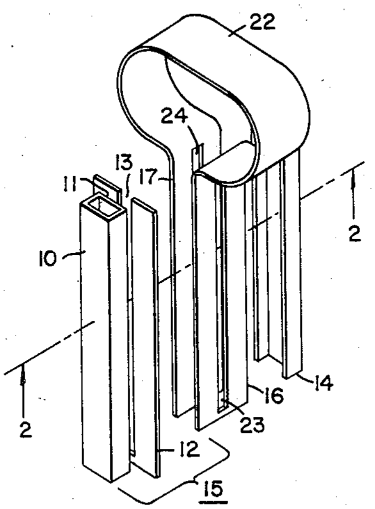
Figure 1 is a perspective view of the electrode system of an electron-discharge device constructed in accordance with the invention.

As shown in the perspective view of Figure 1, the electrode system of a beam-deflection tube or electron-discharge device constructed in accordance with one embodiment of the invention comprises an elongated cathode 10 having an electron-emissive surface 11, and a focusing electrode 12 having a slot 13 centrally located with respect to emissive surface 11. A pair of deflector-receptor electrodes 16 and 17 are disposed adjacent opposite sides of slot 13 and are positioned intermediate the focusing electrode and a collector electrode 14. Electrodes 12, 14, 16 and 17 may be formed from any of the many known electrically conductive materials suitable for use in evacuated electron-discharge devices.

Cathode 10, focusing electrode 12, and the leading edges of electrodes 16, 17 comprise an electron gun 15 for projecting a sheet-like beam of electrons along a predetermined path between electrodes 16 and 17, and collector electrode 14 is disposed transversely across that path in spaced relation to gun 15. The terminology "sheet-like beam of electrons," as used throughout this specification and in the appended claims, refers to an electron beam having one principal cross-sectional dimension which is very much greater than a second principal cross-sectional dimension; the term is not restricted to any particular cross-sectional configuration. Thus, a sheet-like beam may be of rectangular configuration in cross section with a thickness very much smaller than its width, or may be of generally ellipsoidal cross sectional configuration, similarly elongated, or may be of annular or ring-like configuration with the radial thickness of the annulus very much smaller than the circumference. Consequently, it will be understood that the particular structure shown for electron gun 15 is purely illustrative and that any suitable structure for projecting a sheet-like beam in accordance with the definition given above may be employed without departing from the teaching of the invention.

Structures different from that illustrated may be employed to develop a sheet beam of given shape. For example, an accelerating electrode similar to focusing electrode 12 may be interposed between the focusing electrode and the deflector-receptor electrodes. If the D. C. potential applied to the accelerator is different from that applied to the deflector-receptor electrodes, an electrostatic lens may be formed between the accelerator and electrodes 16, 17 to focus and direct the beam more accurately between electrodes 16 and 17 and permit the use of a smaller separation distance $d$ (see Figure 2) between the deflector-receptor electrodes.

Figure 2:
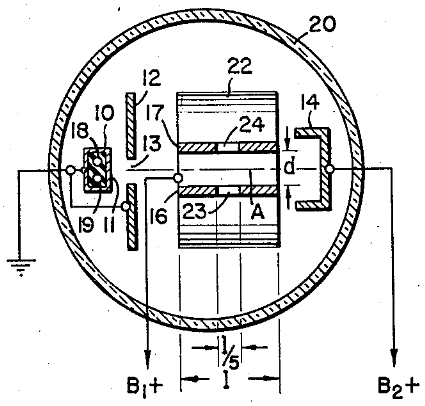
Figure 2 is a cross-sectional view of a device including the electrode system of Figure 1, taken along line 2—2, and further including a schematic representation of external circuitry for the device.

The electrode system of Figure 1 is shown in cross section in Figure 2, in which the normal path of electrons from cathode 10 to collector 14 is indicated by dash line A. Cathode 10 is provided with an indirect heater element 18 embedded in insulating material 19 and supported within the cathode sleeve. The entire electrode system is mounted within a suitable envelope 20, preferably a conventional miniature tube envelope, which is subsequently evacuated and gettered in any manner known in the art.

In the simplified oscillator circuit illustrated in Figure 2, cathode 10 is connected to a source of reference potential, here indicated as ground, and focusing electrode 12 is also connected to ground. The grounding connection for the focusing electrode may be made within envelope 20 as illustrated, or, if preferred, externally thereto. Collector electrode 14, on the other hand, is connected to a source of unidirectional positive biasing potential $B_2+$. Deflector-receptor electrodes 16 and 17 are also connected to a bias potential source $B_1+$ in a manner to be more completely described hereinafter. Preferably, $B_1+$ is lower than $B_2+$ in order to prevent the return of secondary electrons from collector 14 to the deflector-receptor electrodes.

The structure and operation of the beam-deflection tube illustrated in Figures 1 and 2, as thus far described, is generally well known in the art, and a detailed description is deemed unnecessary. Briefly, space electrons originating at emissive surface 11 of cathode 10 are focused by passing through slot 13 of electrode 12 and are projected along path A between deflector-receptor electrodes 16 and 17 so that the beam of electrons is electrostatically coupled to the deflector-receptor electrodes. As in any conventional beam deflection tube, the mean path of the beam from the effective center of deflection toward collector 14 may be controlled by varying the potential difference between electrodes 16 and 17. If the potentials of electrodes 16 and 17 are substantially equal, the mean path of the beam as it proceeds toward collector electrode 14 coincides substantially with original beam path A and operation in this manner is indicated in the drawing for purposes of convenience; however, it may be desirable under certain circumstances to operate the deflector-receptor electrode system comprising electrodes 16 and 17 under bias conditions such that the path of the beam is displaced from the original path A, and an arrangement of this type is entirely within the scope of the present invention. After passing through the space between electrodes 16 and 17, the electrons impinge upon and are collected by electrode 14. Electrodes 16 and 17 are established at a predetermined positive potential with respect to cathode 10 so that the electrons emitted from surface 11 are accelerated to a predetermined velocity corresponding to that potential.

Figure 3:
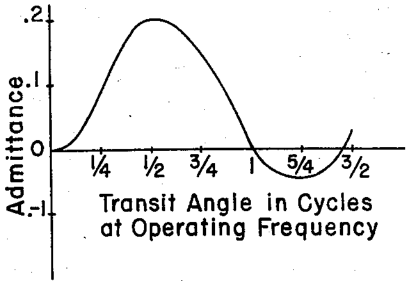
Figure 3 is a graphical representation of an operating characteristic of the electron-discharge device illustrated in Figures 1 and 2.

In a conventional beam-deflection tube, the deflector electrodes are employed only to vary the actual path of the electron beam with respect to the original or mean path A, and a separate output system is employed to derive signals representative of or modulated in accordance with the excursions of the beam from path A. However, whenever an electron beam traverses a deflector system to which an electrical signal has been applied, the beam is deflected to a certain degree so that some transverse electron excursion occurs before the beam leaves the deflector system, and a corresponding current is induced in the deflectors. Generally speaking, this action is similar to transit-time loading of the grid-cathode region in a triode, and may be represented as a load admittance interconnecting the deflector electrodes. Figure 3 illustrates how the relative amount of the conductive part of this admittance depends upon the transit angle required for the electrons of the beam to travel the length of the deflector electrodes. The dimensionless ordinates of this curve must be multiplied by the square of the aspect ratio of the deflection system and by the ratio of beam current to beam voltage in order to obtain the actual admittance; the aspect ratio of the deflector system may be defined as the length $l$ of the deflector electrodes divided by the distance $d$ separating them (Figure 2).

The curve of Figure 3 has long been known as a characteristic of transit-time loading for triodes, and, in modified form, for diodes; however, it has not heretofore been recognized as descriptive of the properties of a deflector- or deflector-receptor electrode system in a beam-deflection tube. For the purposes of this application, it is most important in that it indicates that the effective admittance of the deflector-receptor electrode system 16, 17 is negative when the transit time for electrons passing between the deflector-receptor electrodes is approximately equal to five-fourths of a cycle of the deflecting signal. Consequently, the beam-deflection tube illustrated in Figures 1 and 2 may be made to function as an oscillator by inductively loading deflector-receptor electrodes 16 and 17 so as to form a resonant circuit and adjusting the beam velocity so that the transit angle for the beam electrons in passing through length $l$ of the deflector-receptor system is approximately equal to five-fourths cycle at the resonance frequency. For a large aspect ratio, the beam current required to sustain oscillation is exceedingly small.

In the embodiment of the invention illustrated in Figures 1 and 2, the resonant circuit of the oscillator is formed by connecting an inductive load comprising element 22 between deflector-receptor electrodes 16 and 17. As seen in Figure 1, inductor 22 comprises a single conductive loop, so that the entire resonant circuit structure including electrodes 16 and 17 and inductor 22 may be formed from a single sheet of conductive material. The electrical center of loop 22 is connected to bias source $B_1+$ to provide a convenient means for applying a balanced positive potential to the deflector-receptor electrodes.

Inductance 22, in conjunction with the capacity between electrodes 16 and 17, establishes a resonant circuit having a predetermined resonance frequency. In operation, the velocity of the electron beam projected from cathode 10 to collector 14 is adjusted so that the transit time of the electrons through that portion of beam path A corresponding to length $l$ of the deflector-receptor electrodes is substantially equal to five-fourths cycle at the resonance frequency of the circuit comprising electrodes 16 and 17 and inductor 22; in other words, the resonance period of the tuned circuit is approximately equal to four-fifths of the electron transit time required for the beam electrons to traverse length $l$. Consequently, the transit angle for the electrons of the beam is equal to five-fourths cycle, and, as indicated in Figure 3, a maximum negative admittance exists under these conditions. Thus, the device illustrated in Figures 1 and 2 provides an oscillatory system which is quite stable and which may be made to oscillate at extremely low beam currents.

It has been determined that the contributions to the negative admittance made by individual portions of the electrodes 16, 17 (taken along length $l$) are by no means equal. Indeed, a central portion of approximately one-fifth the total electrode length $l$ has been found to contribute a positive admittance, so that better performance may be obtained by omitting this portion. Accordingly, Figures 1 and 2 illustrate central apertures or slots 23 and 24 of length $l/5$ extending transversely to beam path A through a major portion of electrodes 16 and 17 respectively. This represents a preferred structure; however, excellent operation may be achieved with electrodes which do not have any slots.

Electrode length $l$ should be relatively large in relation to the deflector-receptor electrode separation $d$ in order to take full advantage of the negative admittance characteristic of the tube when oscillation at relatively low beam currents is desired.

In one experimental device constructed in accordance with the invention, the total height of electrodes 10, 12, 16, 17 and 14 was made approximately three-fourths inch, and the deflector electrode length $l$ parallel to the beam path was three-eighths inch. The spacing $d$ between electrodes 16 and 17 was approximately one thirty-second of an inch and the resonant frequency for the tuned circuit comprising inductor 22 and electrodes 16 and 17 was established at 750 megacycles. Electrodes 16 and 17 were formed with uninterrupted conductive surfaces adjacent beam path A, without central slots 23 and 24, and an accelerating electrode essentially similar to electrode 12 was positioned between the focusing electrode and electrodes 16, 17. Despite the fact that the tuned circuit had a relatively low reactance/resistance ratio or Q (about 150), oscillation was obtained with a beam current of 1.5 milliamperes at the accelerating voltage corresponding to five-fourths cycle transit time, which for this particular device was approximately 100 volts. The accelerator was maintained at 300 volts.

The relatively high aspect ratio ($l/d=12$) is a major factor in providing oscillation at a relatively low beam current. It should be noted that a high aspect ratio limits the amplitude of the oscillatory current to a very low level, since the electron beam is intercepted by the trailing ends of electrodes 16 and 17 whenever the voltage between the deflector-receptor electrodes exceeds a predetermined level. This low-level amplitude-limiting characteristic is highly desirable for many local oscillator applications; a lower $l/d$ ratio permits higher-amplitude oscillation but requires more beam current to sustain oscillation.

The electrodes employed in the invention are extremely simple in configuration and may be manufactured from thin metallic sheets by punching or similar methods; the spacing between the various electrodes is not particularly critical and permits the utilization of reasonable manufacturing tolerances. In addition, and for the same reasons, variations in the spacing between the electrodes which may be caused by changes in thermal operating conditions do not adversely affect the stability of the oscillator. Although inductor 22 may be replaced or shunted by an inductor external to tube envelope 20 and additional impedance elements may be included in the resonant circuit to provide for adjustment of the resonant frequency of the oscillation throughout an extended range without departing from the scope of the invention, the preferred structure illustrated herein is particularly advantageous in that it permits incorporation of the principal elements of the resonant circuit within the tube envelope so that only D. C. voltages need be applied by means of external leads.

While a particular embodiment of the present invention has been shown and described, it is apparent that changes and modifications may be made without departing from the invention in its broader aspects. The aim of the appended claims, therefore, is to cover all such changes and modifications as fall within the true spirit and scope of the invention.

I claim:

1. A beam-deflection oscillator comprising: an electron gun for projecting a sheet-like beam of electrons along a predetermined path; a collector electrode disposed transversely across said electron-beam path in spaced relation to said electron gun; means including a pair of deflector-receptor electrodes of predetermined effective length disposed on opposite sides of said beam path intermediate said electron gun and said collector electrode for establishing a beam-electron transit time, through the portion of said path corresponding to said predetermined effective length, of five-fourths of a predetermined resonance period; and an inductive load interconnecting said deflector-receptor electrodes to form therewith a resonant circuit having a resonance period substantially equal to said predetermined resonance period.

2. A beam-deflection oscillator comprising: an evacuated envelope; an electron gun mounted within said envelope for projecting a sheet-like beam of electrons along a predetermined path; a collector electrode disposed within said envelope transversely across said electron-beam path in spaced relation to said electron gun; means including a pair of deflector-receptor electrodes of predetermined effective length disposed within said envelope on opposite sides of said beam path intermediate said electron gun and said collector electrode for establishing a beam-electron transit time, through the portion of said path corresponding to said predetermined effective length, of five-fourths of a predetermined resonance period; and an inductive load positioned within said envelope and interconnecting said deflector-receptor electrodes to form therewith a resonant circuit having a resonance period substantially equal to said predetermined resonance period.

3. A beam-deflection oscillator comprising: an electron gun for projecting a sheet-like beam of electrons along a predetermined path; a collector electrode disposed transversely across said electron beam path in spaced relation to said electron gun; means including a pair of deflector-receptor electrodes of predetermined effective length, disposed on opposite sides of and parallel to said beam path intermediate said electron gun and said collector electrode, for establishing a beam-electron transit time, through the portion of said path corresponding to said predetermined effective length, of five-fourths of a predetermined resonance period; and an inductive load interconnecting said deflector-receptor electrodes to form therewith a resonant circuit having a resonance period substantially equal to said predetermined resonance period.

4. A beam-deflection oscillator comprising: an electron gun for projecting a sheet-like beam of electrons along a predetermined path; a collector electrode disposed transversely across said electron-beam path in spaced relation to said electron gun; means, including a pair of deflection-receptor electrodes of predetermined effective length in the direction of said beam path, for establishing a predetermined velocity for said beam, said deflector-receptor electrodes being disposed on opposite sides of said beam path intermediate said electron gun and said collector electrode, each of said deflector-receptor electrodes having a central aperture extending transversely to said beam path through a major portion of said electrode; and an inductive load interconnecting said deflector-receptor electrodes to form therewith a resonant circuit having a resonance period substantially equal to four-fifths of the electron transit time of the electrons of said beam through the portion of said path corresponding to said predetermined effective length.

5. A beam-deflection oscillator comprising: an electron gun for projecting a sheet-like beam of electrons along a predetermined path; a collector electrode disposed transversely across said electron-beam path in spaced relation to said electron gun; means, including a pair of deflection-receptor electrodes of predetermined effective length in the direction of said beam path, for establishing a predetermined velocity for said beam, said deflector-receptor electrodes being disposed on opposite sides of said beam path intermediate said electron gun and said collector electrode, each of said electrodes having a central aperture of a width approximately equal to one-fifth of said predetermined length and extending transversely to said beam path through a major portion of said electrode; and an inductive impedance element interconnecting said deflector-receptor electrodes to form therewith a resonant circuit having a resonance period substantially equal to four-fifths of the electron transit time of the electrons of said beam through the portion of said path corresponding to said predetermined effective length.

6. An electron-discharge device of the beam-deflection type for generating electrical oscillations of a predetermined frequency, said device comprising: an electron gun for projecting a sheet-like beam of electrons along a predetermined path; a collector electrode disposed transversely across said electron-beam path in spaced relation to said electron gun; and means including a pair of deflector-receptor electrodes each having a centrally located aperture extending transversely to said electron-beam path through a major portion of said electrode disposed on opposite sides of said beam path intermediate said electron gun and said collector electrode for establishing a beam velocity, along said predetermined path, at which the effective length of said deflector-receptor electrodes corresponds to a beam-electron transit angle of substantially five-fourths cycles at said predetermined frequency.

7. An electron-discharge device of the beam-deflection type for generating electrical oscillations of a predetermined frequency, said device comprising: an electron gun for projecting a sheet-like beam of electrons along a predetermined path; a collector electrode disposed transversely across said electron-beam path in spaced relation to said electron gun; and means including a pair of deflector-receptor electrodes of predetermined effective length each having a centrally located aperture of a width approximately equal to one-fifth of said predetermined length and extending transversely to said electron-beam path through a major portion of said electrode disposed on opposite sides of said beam path intermediate said electron gun and said collector electrode and separated by a predetermined distance which is relatively small in relation to said predetermined effective length, for establishing a beam velocity, along said path, at which said predetermined effective length of said deflector-receptor electrodes corresponds to a beam-electron transit angle of substantially five-fourths cycles at said predetermined frequency.

References Cited in the file of this patent

UNITED STATES PATENTS

| | | |
|---|---|---|
| 2,180,958 | Hollmann | Nov. 21, 1939 |
| 2,407,705 | Kilgore | Sept. 17, 1946 |
| 2,484,643 | Peterson | Oct. 11, 1949 |